United States Patent [19]
Heinrich

[11] Patent Number: 6,021,121
[45] Date of Patent: Feb. 1, 2000

[54] DEVICE, METHOD, AND APPARATUS FOR SELECTING ADDRESS WORDS USING DIGITAL SEGMENT FILTERS

[75] Inventor: Peter Heinrich, Edling, Germany

[73] Assignee: STMicroelectronics GmbH, Grasbrunn, Germany

[21] Appl. No.: 08/962,978

[22] Filed: Oct. 30, 1997

[30] Foreign Application Priority Data

Oct. 31, 1996 [DE] Germany ............... 196 45 054

[51] Int. Cl.$^7$ ............... H04J 1/00; H04B 1/00
[52] U.S. Cl. ............... 370/290; 370/497; 707/6
[58] Field of Search ............... 707/6, 529; 370/290, 370/312, 497, 535; 340/855.5; 341/144; 708/300

[56] References Cited

U.S. PATENT DOCUMENTS

| | | | |
|---|---|---|---|
| 4,467,316 | 8/1984 | Musmann et al. | 341/144 |
| 4,484,299 | 11/1984 | Lambourn et al. | 708/319 |
| 4,536,872 | 8/1985 | Lahti | 370/470 |
| 4,571,719 | 2/1986 | Carlqvist et al. | 370/290 |
| 4,638,480 | 1/1987 | Darton | 370/479 |
| 4,788,507 | 11/1988 | Berkowitz et al. | 328/151 |
| 4,811,262 | 3/1989 | White | 708/300 |
| 5,072,422 | 12/1991 | Rachels | 365/49 |
| 5,367,338 | 11/1994 | Rothermel et al. | 348/538 |
| 5,818,344 | 10/1998 | Sharpe | 340/825.21 |

FOREIGN PATENT DOCUMENTS 0 325 670 B1    9/1990   European Pat. Off. .

*Primary Examiner*—Jean R. Homere
*Attorney, Agent, or Firm*—Theodore E. Galanthay; David V. Carlson; Seed and Berry LLP

[57] ABSTRACT

A device for the selection of address words each having n bit locations and serving for addressing m different receiving locations of a digital communication module, in at least one of the receiving locations, including a digital acceptance module through which address words can be selected. The device has an address word segmenting module through which each address word received by the receiving location can be subdivided into s address word segments with b segment bit locations each, wherein b=n/s and n is an integral multiple of s. The device further has z digital segment filters whose inputs can each be fed with an address word segment, with each segment filter having the function of examining one address word segment each with respect to conformity with a predetermined segment bit pattern, and a filter output signal being available at the output of the respective segment filter, which in accordance with the examination result is either a conformity signal or a nonconformity signal. Additionally, the device has an activation module through which those segment filters can be activated during the duration of the respective address word segment to be assessed which carry out an examination with respect to such segment bit patterns which can occur in the address words acceptable for the receiving location in consideration, in the respective address word segment to be assessed. Finally, an evaluation module through which the output signals of the respective segment filters activated for the assessment of an address word can be evaluated with respect to the presence of an address word that is acceptable for the receiving location in consideration.

23 Claims, 7 Drawing Sheets

ACCEPTABLE ADDRESSES

| SEGMENT | A | B | C | D |
|---|---|---|---|---|
| ADR0 : | 00 | 00 | 10 | 11 |
| ADR1 : | 00 | 01 | 00 | 01 |
| ADR2 : | 00 | 11 | 01 | 01 |
| ADR3 : | 11 | 11 | 01 | 10 |

FIG. 10
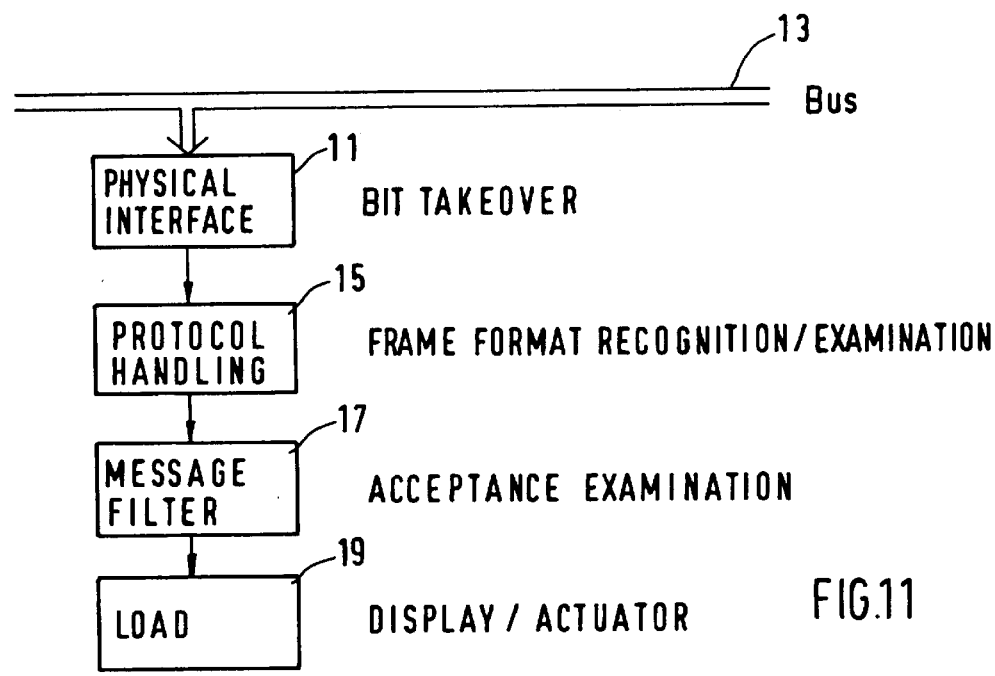
FIG. 11
FIG. 12

DEVICE, METHOD, AND APPARATUS FOR SELECTING ADDRESS WORDS USING DIGITAL SEGMENT FILTERS

CROSS-REFERENCE TO RELATED APPLICATIONS

The following pending U.S. Patent Applications by Peter Heinrich entitled: "Device For Selecting Address Word s By Demultiplex Decoding," Ser. No. 08/960,846, filed Oct. 30, 1997, claiming priority based on German Patent Application No. 196 45 057.8, filed Oct. 31, 1996; and "Electric Circuit Arrangement for the Serial Evaluation of a Bit Sequence", Ser. No. 08/960,944, filed Oct. 30, 1997, now abandoned, claiming priority based on German Patent Application No. 196 45 055.1, filed Oct. 31, 1996, have the same ownership as the present application and to that extent are related to the present application and are incorporated herein by reference.

TECHNICAL FIELD

The present invention relates generally to addressing messages to specific receivers all coupled to a common communications channel.

BACKGROUND OF THE INVENTION

It is usual nowadays, in a system having one or more transmitting locations and several receiving locations, to send a signal transmitted from a transmitting location to all receiving locations via a common transmission channel, for instance in the form of a bus line. For providing the possibility of sending a message from the transmitting location to only one receiving location, the signals transmitted to the receiving location each contain an address word in addition to the message to be transferred. Each of the receiving locations has at least one specific address word associated therewith. The individual receiving locations comprise devices for the selection of the respective address words associated therewith. The receiving location for which the particular message is intended can thus take such messages from the transmission channel which are provided with a data word that is intended for or acceptable to these receiving locations.

If several receivers belong to one receiving location, it is possible to associate an address word of its own with each of these receivers. If certain messages shall be receivable by several receiving locations, this may be accomplished in that each of these receiving locations not only accepts its own address word but also additional address words. In these cases, the receiving location will be designed such that it is adapted to accept several address words.

To determine whether the address word of the message transmitted over the transmission channel, for instance the bus line, is intended for a specific receiving location or not, the address word of the message is compared in the receiving location with the address word or words associated with this receiving location. This takes place conventionally by means of filters having, just as the address words, n bit locations, in which a bit sequence is deposited corresponding to the bit sequence of an acceptable address word. If the particular receiving location is to be capable of accepting several address words, it requires as many filters with n bit locations each as there are acceptable address words. The address word of each message offered to the individual receiving location is compared with each bit sequence in each filter of this receiving location for conformity or nonconformity. If there is conformity, the just received address word is accepted and the message added to this address is allowed to pass to load units of this receiving location. If the just received address word is not in conformity with the bit sequence deposited in one of the filters, this address word is not accepted and the message accompanying this address word does not reach load units of this receiving location.

If in the known acceptance examination method, for example four different address words are to be accepted for one specific receiving location, four filters must be provided in this receiving location each having a filter length equal to the address word length. With an address word length of for instance eight bit locations, 32 filter locations are required in this case. In addition thereto, one needs a correspondingly large number of word lines with a correspondingly high space requirement on the semiconductor chip on which the address selection device is provided.

To determine whether or not a received address word is in conformity with the bit sequence deposited in the filter, XOR gate circuits are conventionally used, namely one such circuit for each bit location of address word and filter. For example, when the address word has eight bit locations, the filter has also eight bit locations, and eight XOR gate circuits are necessary for the comparison of the received address with the bit sequence stored in the filter. The outputs of all XOR elements are passed to an OR element having as many inputs as there are XOR elements. At an output of the OR element, the logic value "0" or the logic value "1" appears, depending on whether or not there is conformity between the just received address word and the word stored in the filter. The logic value "0" at the output of the OR element means thus that the just received address word is accepted by the receiving location in consideration, whereas it is not accepted when the logic value "1" appears at the output of the OR element.

In case of the above-considered conventional solution, each one of the several filters of a receiving location has a filter length equal to the address word length. This requires hardware with a capacity which one possibly would not like to provide for reasons of costs. On the other hand, many word lines are necessary between the address register, in which the address for the filter comparison is stored temporarily, the filters, the XOR elements used for the comparison and the OR element coupled downstream thereof. These word lines require a lot of space on a monolithically integrated semiconductor circuit. XOR elements also require relatively large areas on a semiconductor chip.

What is needed is to reduce the circuit expenditure for the acceptance examination of address words received, in particular in such a manner that chip area can be saved.

SUMMARY OF THE INVENTION

Briefly stated, various embodiments of the invention relate to a device for and a method of selecting address words, each having n bit locations and serving for addressing m different receiving locations of a digital communications apparatus, in at least one of the receiving locations. The device comprises an acceptance apparatus via which address words can be selected which are acceptable for the particular receiving location in consideration.

In one embodiment, the invention provides a device by which it is possible, in a receiving location of a digital communications apparatus, to have selected address words which each have n bit locations and serve for addressing m different receiving locations of the communications apparatus. The device includes a digital acceptance device via which address words can be selected that are acceptable for the receiving location in consideration. The acceptance device comprises:

an address word segmenting device through which each address word received by the receiving location can be subdivided into s address word segments with b segment bit locations each, wherein b=n/s and n is an integral multiple of s;

z digital segment filters whose inputs can each be fed with an address word segment, with each segment filter having the function of examining one address word segment each with respect to conformity with a predetermined segment bit pattern, and a filter output signal being available at the output of the respective segment filter, which in accordance with the examination result is either a conformity signal or a non-conformity signal;

an activation apparatus through which those segment filters can be activated during the duration of the respective address word segment to be assessed which carry out an examination with respect to such segment bit patterns which, in the address words acceptable for the receiving location in consideration, can occur in the respective address word segment to be assessed;

and an evaluation device through which the output signals of the respective segment filters activated for the assessment of an address word can be evaluated with respect to the presence of an address word that is acceptable for the receiving location in consideration.

In a first embodiment of the invention, s segment filter groups are provided each having at least one segment filter, with the number of segment filters per segment filter group each being dependent on the number of the segment bit patterns acceptable for the associated address word segment, each segment filter group being associated with a predetermined address word segment of the respective address word, all segment filters of only one segment filter group each being adapted to be activated simultaneously by the activation means, and the respective address word segment to be examined being adapted to be supplied to the inputs of all segment filters.

A further embodiment of the invention requires fewer segment filters, in which the particular address word segment to be examined can be supplied to the inputs of all segment filters, and via the activation device, upon reception of an address word segment to be examined, all those segment filters of all segment filters present can be activated which perform an examination with respect to the occurrence of segment bit patterns that can be present in the respective address word segment of all address words acceptable for the particular receiving location.

In a preferred embodiment, the examination of the individual address word segments with respect to the contents of the associated segment filters, as discussed in connection with the conventional acceptance test method, takes place using XOR elements whose output signals are fed to inputs of an OR gate circuit. In case of a XOR operation, the logic value "1" arises when the address bit differs from the associated filter bit, whereas the logic value "0" arises when the address bit is in conformity with the corresponding filter bit. At the output of OR element, a logic value "1" thus appears only when one of the XOR elements has a logic value "1" and thus signals non-conformity between the respective address bit and the associated filter bit. Acceptance of the respective address word received thus is assumed only when logic value "0" appears at the output of the OR element.

In the method according to another embodiment of the invention, for selection of address words in at least one of the receiving locations, each address word is subdivided into s address word segments, the individual address word segments are each examined with respect to whether they are in conformity with a segment bit pattern that can be present in the respective address word segment of one of the address words that are acceptable for the particular receiving location, and after examination of all address word segments by way of the examination results for the individual address word segments, an assessment is carried out to the effect whether or not the respective address word received is an address word that is acceptable for the particular receiving location.

BRIEF DESCRIPTION OF THE DRAWINGS

The invention will now be elucidated by way of embodiments more closely. In the drawings:

FIG. 2 shows an example for acceptable address words that are subdivided in address word segments;

FIGS. 3 to 6 show representations of the address word list according to FIG. 2, however with segments with the same bit location contents being marked;

FIG. 10 shows a schematic general representation of a transmission channel having a transmitting location and several receiving locations in a known manner;

FIG. 11 shows a representation of one of the receiving locations in FIG. 10;

FIG. 12 shows an example of four address words that are acceptable for one receiving location.

DETAILED DESCRIPTION OF THE INVENTION

Figure 1:
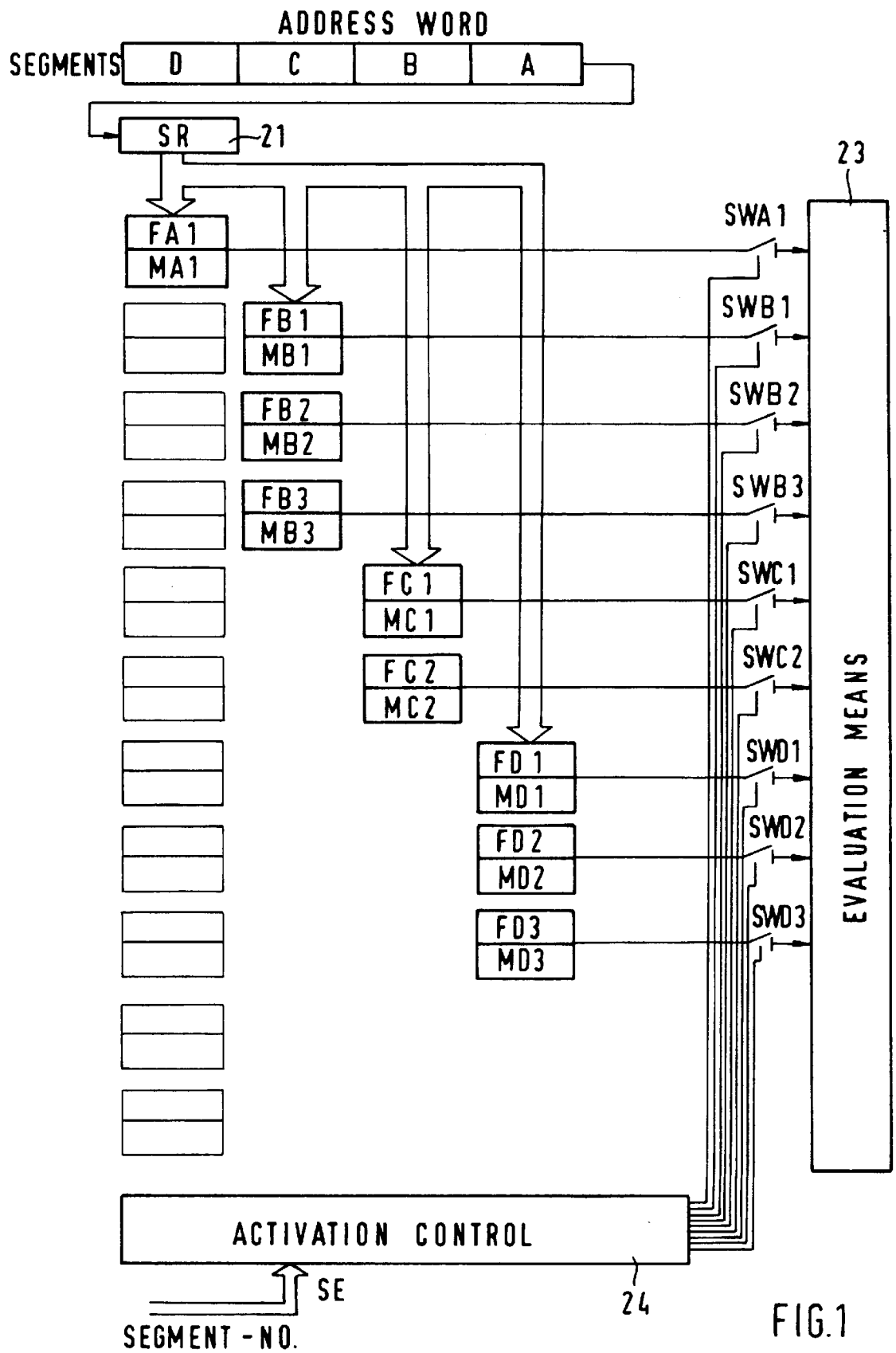
FIG. 1 shows a first embodiment of a selection device according to the invention.

The embodiments presented in FIGS. 1–9 and associated text all can operate in the context of the exemplary communications link and methods discussed in associated with FIGS. 10 through 13.

FIG. 10 shows schematically a known communications means, comprising a transmitter S, a plurality of receiving locations E1, E2, E3 . . . Em and a bus, by means of which transmitter S and receiving locations E1 . . . Em are coupled to each other in series or in a ring. A message transmitted from transmitter S via the bus thus reaches all receiving locations E1 . . . Em. For permitting a message transmitted from transmitter S to be sent selectively to individual receiving locations, the transmitted message not only contains a message word composed of several bits, but also contains an address word composed of a number of bits. Each receiving device contains a means for examining whether or not the address word of the respective message sent is acceptable for the particular receiving location. In the case of acceptance, the message linked to this address word is accepted by the receiving location.

FIG. 11 shows schematically the structure of one of the receiving locations E1 . . . Em. Such a receiving location has a physical interface 11, by means of which a bit takeover of the bus sequence transmitted via a bus 13 is carried out. The output signal of physical interface 11 is fed to a so-called protocol handling means 15, via which frame format recognition and frame format examination are carried out. The output of protocol handling means 15 is followed by a message filter 17 that is used for acceptance testing, i.e., a determination as to whether or not the respective address word transferred is accepted by the receiving location in consideration. In case of acceptance, the message transferred with the accepted address word is passed to a load 19, which may be a display device, an actuator or the like. The present invention relates to an improvement of message filter 17.

Figure 13:
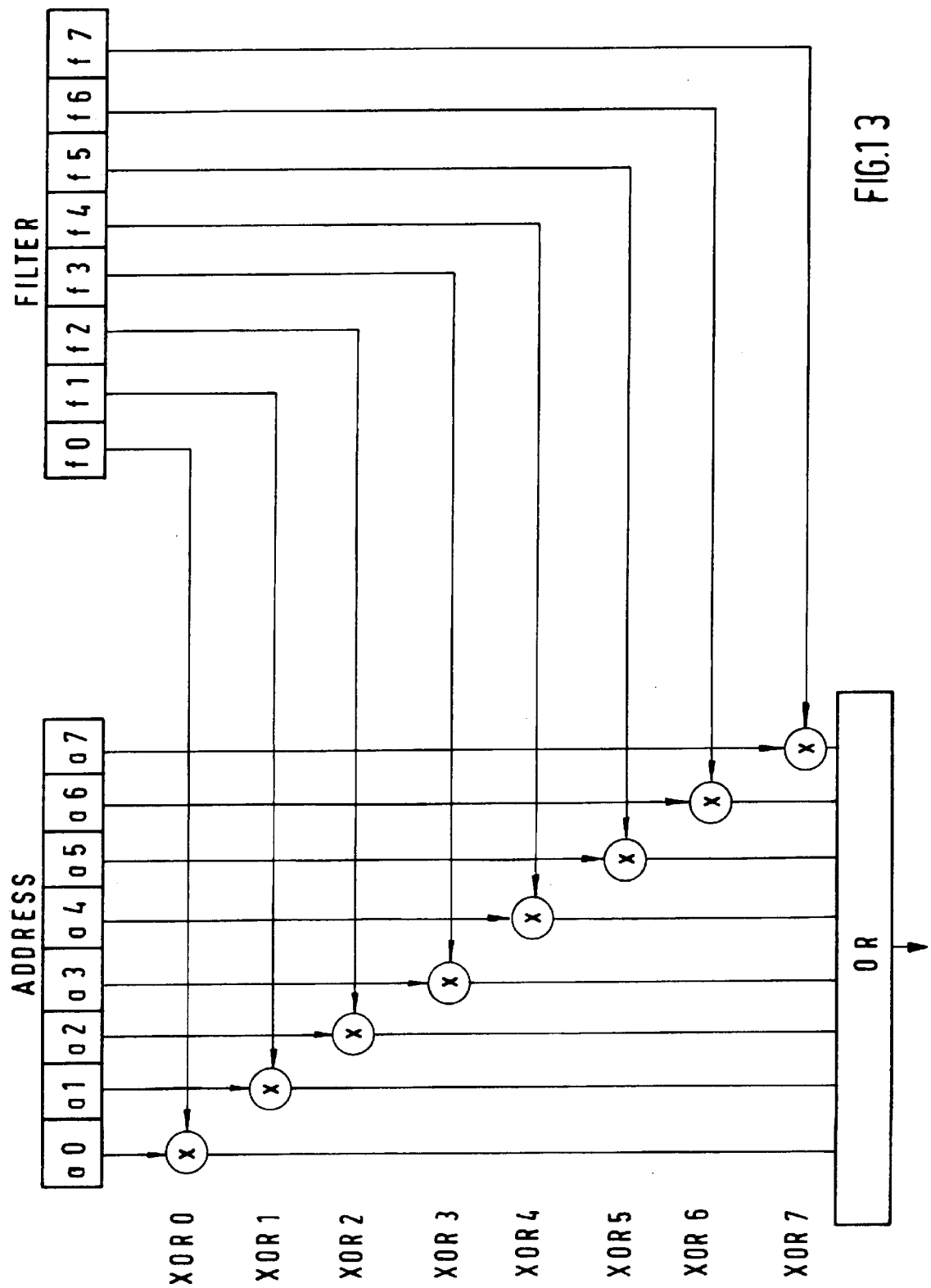
FIG. 13 shows a conventional filter circuit.

FIG. 12 shows an example of four address words ADR0, ADR1, ADR2, and ADR3, which are to be accepted for one specific receiving location. FIG. 13 shows a practical realization of an acceptance examination means when there is only one acceptable address word and thus only a single filter is required. When conventional message filters are used for the acceptance examination of four address words, four filters with eight filter bit locations each are necessary for determining whether the respective data word transferred is one of the four acceptable data words or an unacceptable data word. Therefore, four filters with 32 filter locations are necessary. Furthermore, a correspondingly large number of word lines are required on the semiconductor chip in which this receiving location is monolithically integrated.

A first embodiment of a device according to the invention for acceptance examination or selection of address words is shown in FIG. 1 in a schematic block diagram. This embodiment is based on the assumption that an address word is present that is subdivided in four address word segments (in the following also referred to as segments) A, B, C, and D. In the embodiment shown in FIG. 1, a shift register 21 is used having only as many register locations as there are bits contained in one address word segment. The individual segments A, B, C, and D of the address word shown above the shift register 21 are successively stored in this shift register 21, and acceptance examination is carried out for the respective segment located in the shift register.

For the embodiment shown in FIG. 1 it is assumed furthermore that each address word consists of eight bit locations, each segment has two bit locations and the particular receiving location is to accept four address words, as indicated by way of example in the table shown in FIG. 2. The embodiment according to FIG. 1 includes not only filters, but also masks providing the possibility of masking individual bit locations in the individual segments in so far as acceptance is signaled for the corresponding bit location, irrespective of whether or not the binary value of this bit location of the address word is identical with the binary value of the corresponding filter location.

The embodiment shown in FIG. 1 has four filter groups each associated with one of the four segments A to D. The filter group associated with segment A includes a filter FA1 and a mask MA1. Segment B includes a filter group with three filters FB1, FB2, FB3, each having a mask MB1, MB2 and MB3, respectively, associated therewith. Segment C includes a filter group with two filters FC1 and FC2, each having a mask MC1 and MC2, respectively, associated therewith. Associated with segment D is a filter group with three filters FD1, FD2 and FD3, each having a mask MD1, MD2 and MD3, respectively, associated therewith.

The four address words shown as an example in FIG. 2 must be examined with respect to acceptability thereof via the filters and masks shown in FIG. 1. As shown in FIG. 2, segments A of all four acceptable address words ADR0 to ADR3 have only two different bit patterns, namely "00" and "11". If no masks were provided, the filter group belonging to segment A would have to have two filters, one examining with respect to the presence of the bit combination "00" and the other one examining with respect to the presence of the bit combination "11". In the embodiment of FIG. 1, mask MA1 is designed such that it ignores both bit locations of segment A, i.e., it signals acceptance for both bit locations irrespective of the binary value.

The filter group belonging to segment B contains three filters and thus as many filters as bit patterns can occur in segment B of all four acceptable address words, namely the bit patterns "00", "01" and "11". As there are as many filters present as there are possible bit patterns, all three masks in the filter group belonging to segment B are designed such that they ignore none of the two bit locations of segment B, but signal acceptance only when both bit locations of segment B of the respective address word received exactly correspond to the bit pattern of one of the three filters FB1, FB2 and FB3.

Segment C has two filters and two masks associated therewith. Due to the fact that in segment C of the four acceptable address words three different bit patterns occur, namely "10", "00" and "01", while only two filters are provided, one of the masks MC1 and MC2 is designed such that it ignores none of the two bit locations of the associated filter, while the other mask ignores one of the bit locations of the associated filter. For instance, filter FC1 can have the filter contents "10" and the second filter can have the filter contents "00". In this case, the mask associated with the first-mentioned filter would ignore no bit location, whereas the mask associated with the second-mentioned filter would not ignore the first bit location, but would ignore the second bit location.

Due to the fact that in segment D of all four acceptable address words three different bit patterns occur, namely "11", "01" and "10", and since the filter group associated with segment D comprises three filters FD1, FD2 and FD3, the respectively associated masks MD1, MD2 and MD3, respectively, are each designed such that they ignore none of the two bit locations of the associated filter.

The output of each filter/mask unit is coupled via a switch to a respectively associated input of an evaluator 23. Each filter group has a switch group associated therewith. The first filter group with the filter/mask unit FA1/MA1, which belongs to segment A, has a first switch SWA1 associated therewith. The second filter group with the filter/mask units FB1/MB1, FB2/MB2 and FB3/MB3 has a switch group SWB1, SWB2 and SWB3 associated therewith. The filter group with the filter/mask units FC1/MC1 and FC2/MC2 has a switch group SWC1 and SWC2 associated therewith. The filter group with the filter/mask units FD1/MD1, FD2/MD2 and FD3/MD3 has a switch group SWD1, SWD2 and SWD3 associated therewith.

The bits of the respective address word segment shifted into shift register 21 are offered to the inputs of all filters FA1 to FD3 simultaneously. The filter/mask units of the filter group in charge of the respective segment can each be activated with the aid of an activation control 24 in that the respective switches are switched to the conducting state via activation control 24.

FIG. 1 shows underneath the filter/mask unit FA1/MA1 further filter/mask units in dotted lines. This is to point out that, in the integrated circuit in which the selection means according to the invention is accommodated, there is provided in a row (shown in FIG. 1 underneath the shift registers) a supply of filter/mask units, and the number of filter/mask units thereof necessary for the specific selection means is utilized and is associated in groups with the individual address word segments.

In the embodiment shown in FIG. 1 and on the assumption corresponding to FIG. 2, that each address word segment has two bit locations, a shift register 21 having two register locations is used. Thus, with respect to the address word to be examined for acceptance, two bits each in succession are shifted into shift register 21 and, at the end of insertion of the bit pair of the respective segment, the evaluation for the respective segment is carried out.

Via the activation control 24, the filter groups belonging to the individual segments A, B, C, and D are activated successively in that, during each segment, all switches belonging to the associated segment filter group are switched to the conducting state. To this end, the activation control 24 is informed via a control input SE about the number of the examined segment, so as to switch the associated switch group to the conducting state. With this mode of operation, the evaluator 23 evaluates the examination result signals received by it from the respective activated filter group during each segment, for assessing whether or not an acceptable address word has been received, and possibly which one of the four acceptable address words has been received.

The evaluator 23 performs either a parallel evaluation at the end of the acceptance examination of the last segment of the respective address word or a sequential evaluation at the end of the acceptance examination of each segment. Circuit examples thereof are shown in FIGS. 1a and 1b, respectively.

Figure 1A:
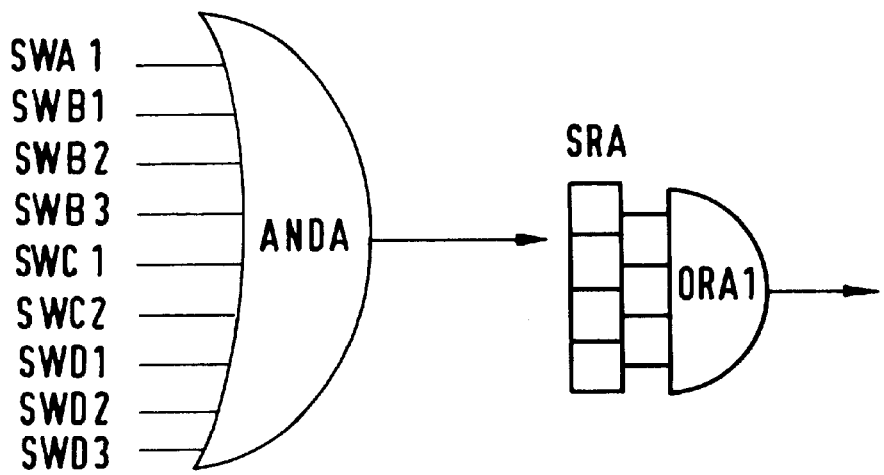
FIG. 1a shows a circuit device for parallel acceptance examination evaluation.
Figure 1B:
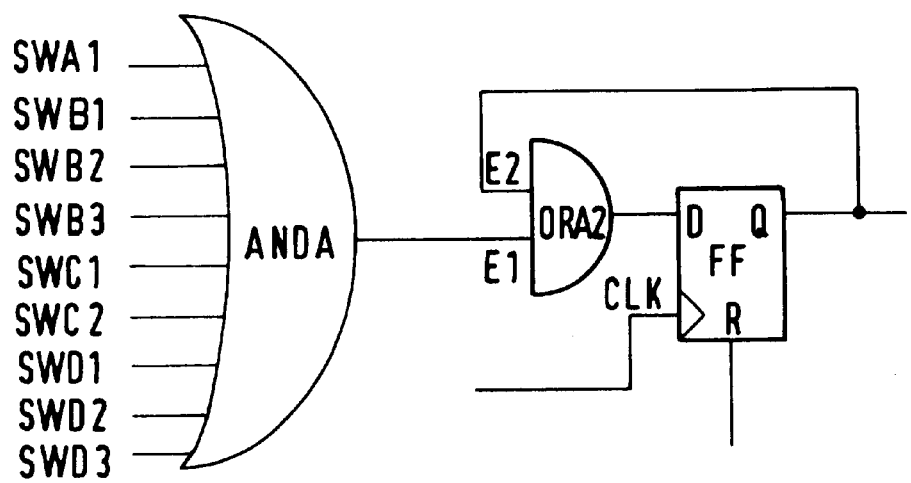
FIG. 1b shows a circuit device for sequential acceptance examination evaluation.

The embodiment for a parallel acceptance examination evaluation, as shown in FIG. 1a, comprises an evaluation AND gate circuit ANDA including for each of the switches SWA1 to SWD3 an input coupled to the respective switch. An output of ANDA is coupled to an input of an evaluation shift register SRA having for each address word segment a register location, i.e., four in the present example. Each register location has a register location output. The evaluation shift register SRA is followed by an evaluation OR gate circuit ORAL having one input each for each address word segment, each of these inputs being coupled to one of the register location outputs. At an output of ORA1, the acceptance examination evaluation result for the respective address word is available.

A selection device of the type shown in FIG. 1, having a parallel evaluation means according to FIG. 1a, operates as follows:

Each of the switches SWA1 to SWD3, when it is set to the non-conducting state by activation control 24, delivers the logic value "1" to the evaluator 23. Each of the filter/mask units FA1/MA1 to FD3/MD3, whose mode of operation will be elucidated in more detail further below by way of FIG. 9, delivers at its output a logic value "0" or a logic value "1" depending on whether a segment examined by it is rated acceptable or not acceptable. An input of ANDA thus receives the logic value "0" only when the associated switch SWA1 to SWD3 is in the conducting state and the filter/mask unit coupled to this switch recognizes the respective address word segment as an acceptable one. When all respective activated filter/mask units signal non-acceptance by issuing the logic value "1", all inputs of ANDA receive the logic value "1", and the logic value "1" appears at the output of ANDA. When one of the activated filter/mask units signals acceptance by issuing the logic value "0", the corresponding input of ANDA receives this logic value "0", and the logic value "0" appears at the output of ANDA. Depending on whether a segment is rated as acceptable or as non-acceptable, either the logic value "0" or the logic value "1" thus appears at the output of ANDA. The latter is shifted into the evaluation shift register SRA with the same clock signal with which the individual address word segment are shifted into shift register 21. At the end of the address word to be examined, the evaluation shift register contains four segment assessment bits which are subjected to an OR operation via ORA1. Only when at the end of the respective address word all four register locations of SRA have the logic value "0" stored therein, does the logic value "0" appear at the output of ORA1, which signals acceptance of the address word examined. If, however, the logic value "1" appears at the output of ORA1, the examined address word has not been accepted in at least one segment and thus is not an acceptable address word.

The embodiment shown in FIG. 1b for a sequential acceptance examination evaluation also comprises an evaluation AND gate circuit ANDA, which, just as FIG. 1a, has for each of the switches SWAT to SWD3, an input coupled to the respective switch. In case of FIG. 1b, the output of ANDA is, however, coupled to a first input E1 of an evaluation OR gate circuit ORA2 having two inputs E1 and E2. ORA2 is followed by a clocked RS flip-flop FF, which has a setting input S coupled to an output of ORA2, a clock input CLK, a resetting input R and a non-inverting Q output. The clock input CLK receives the shift clock signal that is also supplied to segment shift register 21. The clocking of flip-flop FF happens, for example, along with the rising edges of the clock signal. The Q output, from which the acceptance evaluation signal is available, is coupled to the second input E2 of ORA2. The resetting input R is fed, prior to acceptance examination of an address word, with a resetting signal, causing at the Q output a logic value "0", thus a logic value signaling acceptance.

A selection means of the kind shown in FIG. 1, having a sequentially operating evaluation means according to FIG. 1b operates as follows:

As in case of FIG. 1a, the logic value "0" or the logic value "1" appears at the output of ANDA depending on whether or not a segment is deemed acceptable. If all segments of the address word to be examined are accepted by the filter/mask units, a sequence of four logic values "0" appears at the output of ANDA at the end of the examination of the last segment of this address word. When an unacceptable address word is examined, this sequence has in at least one location the logic value "1". As long as the Q output displays the logic value "0" after resetting of flip-flop FF and only acceptable address word segments are ascertained and thus only logic values "0" appear at the output of ANDA, the Q output remains on logic value "0" indicating acceptance. As soon as an address word segment is rated nonacceptable, and thus logic value "1" appears at the output of ANDA, the Q output of flip-flop FF switches over to logic value "1" when receiving the next clock pulse at its clock input CLK. The latter logic value "1" is fed back via ORA2 to the S input of flip-flop FF, irrespective of the logic values of subsequent bits of the bit sequence produced at the output of ANDA for the address word to be examined This means that the Q output remains on "1" until flip-flop FF is reset at the beginning of the examination of a following address word, so that at the end of the assessment of the last segment of the address word to be examined, the signal indicating non-acceptance is present at the Q output.

In the embodiment shown in FIG. 1, the individual filters of each filter group are available only for the assessment of the address word segment belonging to the respective filter group. When a specific segment bit pattern occurs in several address word segments of the acceptable address words, the filter with the corresponding filter contents is present in each of these filter groups, i.e., it is present several times.

However, there is also the possibility of providing each filter having specific filter contents only once, even if the corresponding segment bit pattern is present in various address word segments of the acceptable address words. When the bit pattern corresponding to the filter contents of one specific segment filter is present in various segments of the acceptable address words, this filter is used for a plurality of segments in that it is activated during acceptance examination of all those segments in which this bit pattern can occur.

Such an embodiment will now be elucidated by way of FIGS. 3 to 8.

FIGS. 3 to 6 show the same address word list as FIG. 2, with the same segmentation. Segment bit patterns present several times in FIGS. 3 to 6 are marked, with each of these FIGS. 3 to 6 pointing out a different one of the segment bit patterns occurring several times. It can be seen from FIGS. 3 to 5 that the segment bit patterns "00", "11" and "01" each occur in three segments and in three acceptable address words. According to FIG. 6, the segment bit pattern "10" is present in two segments of two acceptable address words. An overall consideration of FIGS. 3 to 6 reveals that all acceptable address words can be put together from these four segment bit patterns. When providing four filters having the corresponding filter contents, it is thus possible to examine all four acceptable address words for acceptance via these four filters.

Figure 7:
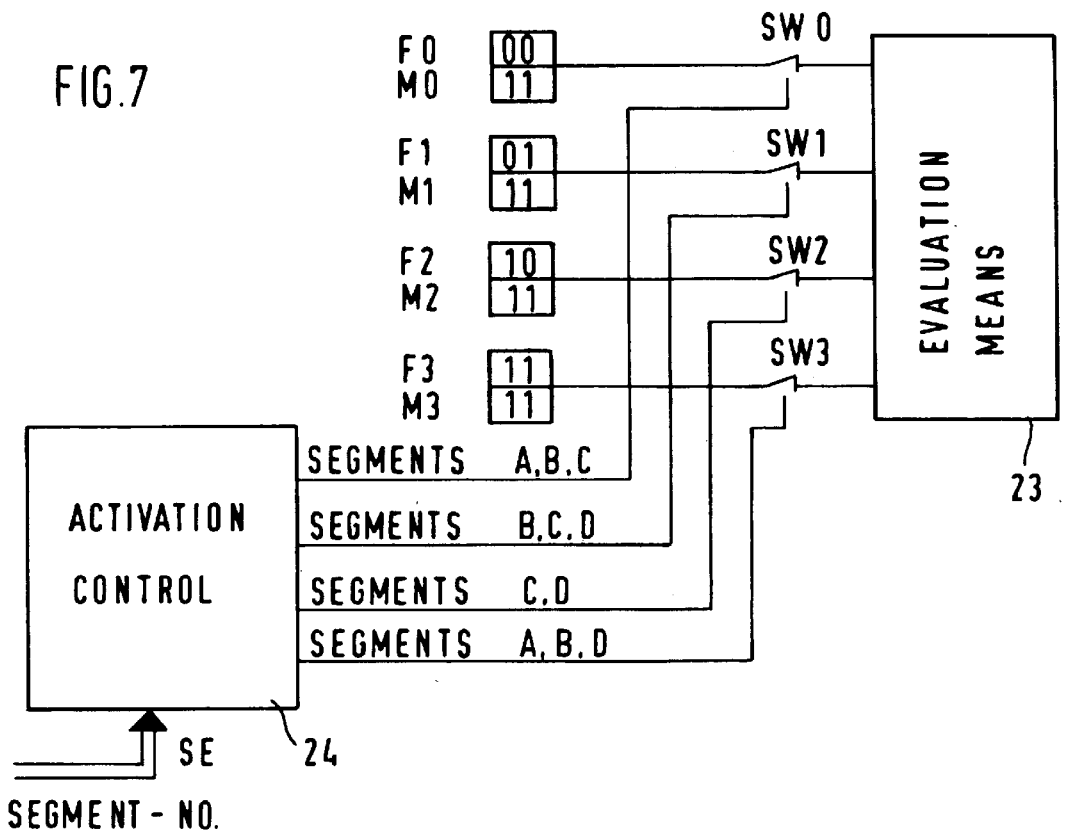
FIG. 7 shows a second embodiment of a selection device according to the invention.

FIG. 7 shows a corresponding circuit arrangement having four filters F0, F1, F2, F3, via which the presence of segment bit patterns "00", "01", "10" and "11", respectively, can be examined. Each of these filters has a mask M0, M1, M2, and M3, respectively, associated therewith, each having the mask bit pattern "11". This means that no bit location of the four filters F0 to F3 is ignored in the acceptance examination, but that acceptance takes place only when a segment bit pattern appears which exactly corresponds to one of the filter patterns.

With the segmentwise examination of the received address words for acceptance, according to the invention, it is possible to make do with considerably fewer filter locations, in particular when several ones of the address words to be accepted have an identical segment bit pattern in one or even several address word segments. For such an address word segment, correspondingly fewer segment filters need to be provided.

As in the embodiment of FIG. 1, the embodiment shown in FIG. 7 includes an activation control 24 and an evaluator 23. The outputs of the filter/mask units F0/M0, F1/M1, F2/M2 and F3/M3 are each coupled via a switch SW0, SW1, SW2 and SW3, respectively, to a respectively associated input of evaluator 23. Switches SW0 to SW3 can be brought to the conducting state via the activation control 24. The activation control 24 receives, via a control input SE, information as to which segment of an address word is to be assessed at the particular time. During each of the segments A to D, those switches SW0 to SW3 are brought to the conducting state which couple those filters to evaluator 23 which correspond to the respective segment in all acceptable address words.

Since segment bit pattern "00" can occur in segments A, B and C of acceptable address words, switch SW0 is set to the conducting state during segments A, B and C. According to the occurrence of the filter contents of filters F1, F2 and F3 in the individual address words, switch SW1 during segments B, C, D, switch SW2 during segments C, D and switch SW3 during segments A, B, D are set to the conducting state.

On the basis of whether and which ones of the filters report acceptance during the individual segments, the evaluator 23 assesses whether a respective acceptable address word has been received and, if so, which one of the acceptable address words.

With this embodiment, only as many segment filters are necessary per address word segment as there are different bit patterns in the respective address word segments of the address words acceptable for the receiving location in consideration.

Figure 8:
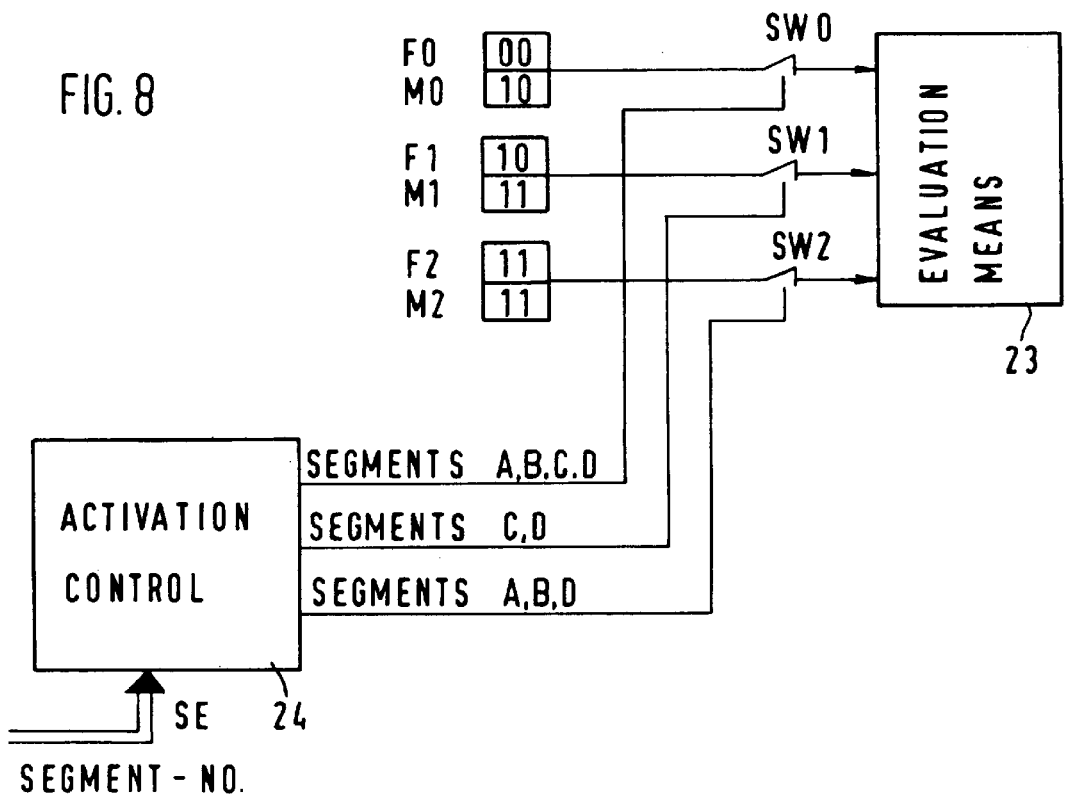
FIG. 8 shows a third embodiment of a selection device according to the invention.

FIG. 8 shows an embodiment that is very similar to the embodiment shown in FIG. 7, but having only three filter/mask units F0/M0, F1/M1 and F2/M2 with one associated switch SW0, SW1 and SW2, respectively, each. While masks M1 and M2 have a mask content "11", thus ignoring no bit location of the associated filter, mask M0 has the mask content "10", so that the first bit location "0" of segment filter F0 is not ignored whereas the second bit location "0" of this filter is ignored. This means that filter/mask unit F0/M0 accepts bit patterns "00" and "01". This is why the embodiment shown in FIG. 8 accepts not only the four address words shown in FIGS. 2 to 6, but in addition address words having, at the locations marked in FIG. 3, the segment bit pattern "01" instead of the segment bit pattern "00".

While the conventional method for acceptance examination of the four acceptable address words shown in FIG. 12 requires 32 filter bit locations, the embodiment shown in FIG. 7 needs only eight filter bit locations for acceptance examination of the same four acceptable address words. In case of masking according to FIG. 8, only six filter bit locations are required. Still more significant than these considerable savings of filter bit locations is the reduction of the necessary word lines, which, as already mentioned, results in enormous savings of chip area for the monolithic integration of such an address word selection device.

With this embodiment one needs only as many segment filters as there can be segment bit patterns in all address word segments of all address words acceptable for the particular receiving location. In comparison with the conventional method, in which each address word that is to be acceptable for a receiving location requires one filter each with the full address word length, the embodiment of the invention considered last results in considerable savings of filter locations and thus hardware. Moreover, this embodiment leads to a correspondingly great reduction in word lines required in total, thus providing considerable savings in chip area.

Further savings of filters can be achieved by associating at least with part of the segment filters one ask each via which can be determined that a part of the it locations of the associated segment filter is ignored in so far as, for this bit location, acceptance is made irrespective of whether the respective received address word in the masked bit location is in conformity with the corresponding bit location of the associated segment filter or not. Via such a mask, which as such has already been utilized also in conventional filters with full address word length, the method according to the invention can reach an even further reduction of the number of necessary segment filters.

The masks may be realized with the aid of mask registers of b bit storage locations associated with one segment filter each.

Figure 9:
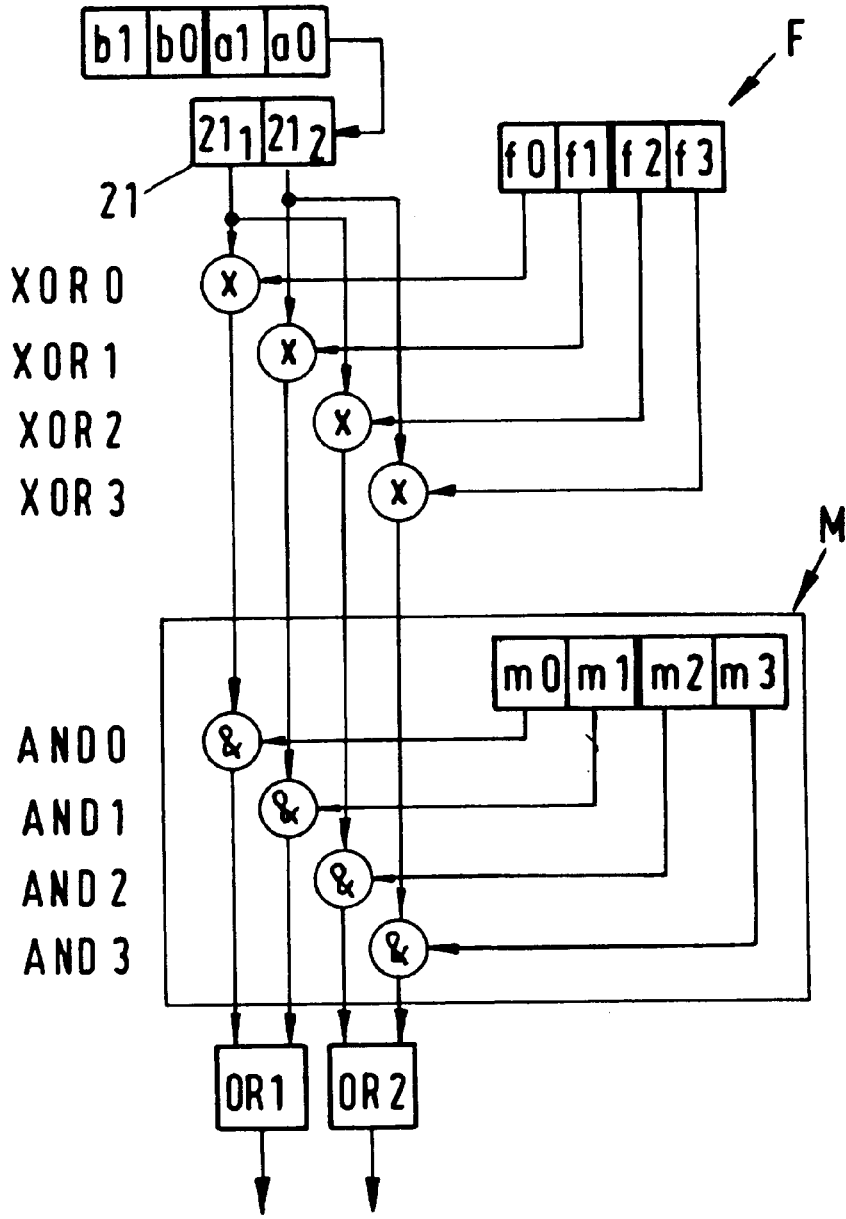
FIG. 9 shows a first embodiment of a circuit arrangement with logic elements.

FIG. 9 shows an embodiment of a conformity examination circuit having masked filters and an evaluation means of an address word selection device according to the invention. For the purpose of simplification, it is assumed that there are only address words having only two address word segments A and B with address bit locations a0 and a1 as well as a2 and a3, respectively. Accordingly, there is shown a filter with only two segment filters each having two filter locations f0 and f1 as well as f2 and f3, respectively, and a mask with only two segment masks each having two mask locations m0 and m1 as well as m2 and m3, respectively.

With this embodiment, the two address word segments A and B are successively introduced into an address segment register 21 having two register locations $21_1$ and $21_2$ with one register location output each, each serving for receipt of one address word segment each having two bit locations. For the in total four bit locations of the address word, there are provided four XOR elements XOR0, XOR1, XOR2, and XOR3. Coupled to the two register location outputs are XOR elements XOR0 and XOR1 while the first segment A is stored, and XOR elements XOR2 and XOR3 while the second segment B is stored. Via XOR0 to XOR1, the respective contents of the two register locations are compared with the contents in the corresponding filter locations with respect to conformity or non-conformity. Due to the fact that a XOR element, as is known, issues an output logic value "0" when the logic values fed thereto on the input side are identical, and issues an output logic value "1" when these are not identical, conformity between the bit pattern of a segment and the filter contents of a corresponding segment filter is present when the outputs of the two associated XOR elements display the logic value "0".

The output signals of the XOR elements, with the aid of one AND element AND0, AND1, AND2 and AND3, respectively, each are subjected to masking in accordance with the logic values in the individual mask locations m0, m1, m2 and m3, respectively. In case the logic value "1" is found in a mask location, the output logic value of the corresponding AND element is dependent upon the output logic value of the associated XOR element. When, however, the logic value "0" is found in a mask location, the logic value "0" appears at the output of the corresponding AND element irrespective of the output logic value of the corresponding XOR element. In case of a logic value "1" in a mask location, the corresponding bit location of the corresponding address word segment thus must be in conformity with the contents of the corresponding filter location to be accepted. In case of a logic value "0" in a mask location, acceptance is reported irrespective of whether or not the associated bit location of the corresponding address word segment is in conformity with the contents of the corresponding filter location, the question whether or not the corresponding address word bit is in conformity with the contents of the corresponding filter location being thus ignored.

In the embodiment shown in FIG. 9, the output logic values of the two AND elements associated with one address word segment each are directly fed to an OR element OR1 or an OR element OR2, respectively. When all output logic values of the four AND elements indicate conformity, each of the two OR elements OR1 and OR2 are fed only with logic values "0", so that a logic value "0" appears at the output of each of the OR elements OR1 and OR2. In case even just one of the AND elements delivers an output logic value "1", the logic value "1" appears at the output of the corresponding OR element OR1 or OR2. A logic value "0" at the output of each one of the OR elements OR1 and OR2 indicates acceptance of the examined address word, whereas a logic value "1" at the output of at least one of the two OR elements indicates non-acceptance of the examined address word.

In embodiments with masks, the output signals of the individual XOR elements are linked with the contents of the individual mask registers via AND elements whose output signals are supplied to the inputs of the OR element. If a specific filter bit location is not to be ignored, the associated mask register location contains logic value "1". The corresponding input of the OR element thus is fed with logic value "0" indicating acceptance only when the particular address bit is in conformity with the associated filter bit. If the corresponding address bit location is to be ignored with respect to conformity or nonconformity with the corresponding filter bit, the associated mask register location contains logic value "0", so that the output of the corresponding AND element, irrespective of the particular bit value of the associated address bit locations, always delivers the logic value acceptance.

The overall evaluation at the end of an address word can take place in parallel in case of the method elucidated in connection with FIG. 1a. For this purpose, it is for example possible to temporarily store the output logic values of the two OR elements OR1 and OR2 appearing one after the other in terms of time, in a shift register and to evaluate them at the end of the last segment of the address word to be examined via the OR element ORA.

In the embodiment of FIG. 9, each filter location has an XOR element of its own associated therewith and each mask location has an AND element of its own associated therewith, and a switchable segmentwise connection of the two register location outputs is established first with XOR0 and XOR1 and then with XOR2 and XOR3.

In comparison with the method shown in FIG. 13, the method of segmentwise processing of the invention, according to the embodiments of FIGS. 1, 7 and 8, and in particular with the segment-overlapping filter utilization method in the embodiment shown in FIG. 7, requiring considerably fewer filter locations and considerably fewer word lines, resulting in the advantages already set forth hereinbefore. Besides, considerably fewer XOR elements are necessary. Due to the fact that switches, as they are provided on the one hand between the filter outputs and the evaluator 23 and on the other hand in the activation control, necessitate considerably less circuit expenditure than XOR elements, the acceptance examination method according to the invention in total involves considerably less circuit expenditure than the conventional acceptance examination method, in addition to the considerable savings in chip area due to the reduced number of necessary word lines.

With the segmentwise examination of the received address words for acceptance, according to the invention, it is possible to make do with considerably fewer filter locations, in particular when several ones of the address words to be accepted have an identical segment bit pattern in one or even several address word segments. For such an address word segment, correspondingly fewer segment filters need to be provided.

I claim:

1. A device for the selection of address words each having n bit locations and for addressing m different receiving locations of a digital communications means, in at least one of the receiving locations, including a digital acceptance means through which address words can be selected that are acceptable for the receiving location in consideration, and which comprises:

a) an address word segmenting means through which each address word received by the receiving location can be subdivided into s address word segments with b segment bit locations each, wherein b=n/s and n is in integral multiple of s;

b) z digital segment filters whose inputs can each be fed with an address word segment, with each segment filter having the function of examining one address word segment each with respect to conformity with a predetermined segment bit pattern, and a filter output signal being available at the output of the respective segment filter, which in accordance with the examination result, is either a conformity signal or a non-conformity signal;

c) an activation means through which those segment filters can be activated during the duration of the respective address word segment to be assessed which carry out an examination with respect to such segment bit patterns which can occur in the address words acceptable for the receiving location in consideration, in the respective address word segment to be assessed; and d) an evaluation means through which the output signals of the respective segment filters activated for the assessment of an address word can be evaluated with respect to the presence of an address word that is acceptable for the receiving location in consideration.

2. A device according to claim 1, in which s segment filter groups are provided having at least one segment filter each, with the number of segment filters per segment filter group being dependent on the number of the segment bit patterns that are acceptable for the associated address word segment;

each segment filter group being associated with a predetermined address word segment of the respective address word;

all segment filters of only one segment filter group each being adapted to be activated simultaneously via the activation means; and the respective address word segment to be examined being adapted to be fed to the inputs of all segment filters.

3. A device according to claim 1, in which the respective address word segment to be examined is adapted to be supplied to the inputs of all segment filters, and via the activation means, during occurrence of an address word segment to be examined, all those segment filters of all segment filters provided can be activated which examine the occurrence of segment bit patterns that can occur in this address word segment of all address words acceptable for the receiving location in consideration.

4. A device according to claim 3, in which at least one segment filter each is provided for each segment bit pattern that can occur in the address words acceptable for the receiving location in consideration.

5. A device according to claim 3, in which a segment filter is provided not for each segment bit pattern that can occur in the address words acceptable for the receiving location in consideration, and for at least part of the segment filters one mask each is provided, via which it can be determined whether the assessment carried out by the segment filter belonging to the mask upon examination of a specific bit location of an address word segment, is to be ignored or not.

6. A device according of claim 1, comprising a segment shift register having b register locations, in which the bits of the respective address word segment to be examined can be introduced;

with each segment filter comprising:

a filter having s segment filters each having b register locations for storing the bit pattern belonging to the respective filter segment;

and n XOR elements for the bit-location-wise XOR linking of the bit pattern of the respective address word segment stored in the segment shift register with the segment bit pattern stored in the respectively associated segment filter;

the register locations of the segment shift register and the XOR elements having disposed therebetween a switching means through which register location outputs of the register locations of segment shift register can be coupled to the associated ones of the XOR elements during each address word segment;

and with the evaluation means having one OR element per address word segment, each thereof having b inputs that are each coupled to the output of one of those XOR elements that belong to the respective address word segment, in which it is possible to derive from the output signals of the OR elements whether the respective address word is acceptable or not.

7. A device according to claim 6, with each mask comprising:

a mask register having s mask register segments with b mask storage locations each for storing a mask bit pattern;

and n AND elements each having two inputs and one output, with one of the inputs being coupled with the output of one of the XOR elements, the second input being coupled with the output of a mask storage location and the output being coupled with one of the inputs of the OR elements.

8. A device according to claim 1, in which the activation means comprises a controllable switch means coupled between the segment filters and the evaluation means and, in the non-activating switching state, delivering to the evaluation means a logic value having the meaning of non-acceptance associated therewith, and in the activating switching state, passing the logic value delivered from the associated segment filter, on to the evaluation means.

9. A device according to claim 1, further comprising:

a conformity examination circuit, in which the evaluation means for a parallel acceptance examination evaluation of the acceptance examination results obtained in segmentwise, successive manner for the individual address word segments comprises:

an evaluation AND gate circuit having as many inputs as parallel examination result signals are fed to the evaluation means at the end of each address word segment examination;

an evaluation shift register having a data input coupled to an output of the evaluation AND gate circuit, and having for each address word segment a register location with one register location output each;

and an evaluation OR gate circuit having one input per address word segment, each of said inputs being coupled to one of the register location outputs, and having an output from which an acceptance evaluation result signal for the respective address word is available.

10. A device according to claim 1, further comprising:

a conformity examination circuit, in which the evaluation means for a sequential acceptance examination evaluation of the acceptance examination results received in segmentwise, successive manner for the individual address segments comprises:

an evaluation AND gate circuit having as many inputs as parallel examination result signals are fed to the evaluation means at the end of each address word segment examination;

an evaluation OR gate circuit having two inputs, a first one thereof being coupled to an output of the evaluation AND gate circuit;

and a clocked RS flip-flop having a setting input coupled to an output of the evaluation AND gate circuit, a clock input adapted to be fed with a clock signal corresponding to an address word segment clock, a resetting input and non-inverting flip-flop out-put, the flip-flop output being coupled to the second input of the evaluation OR gate circuit, an acceptance evaluation result signal for the respective address word being available from the flip-flop output, and the resetting input, prior to the acceptance examination of an address word, being adapted to be fed with a re-setting signal causing at the flip-flop output an acceptance evaluation result signal signaling acceptance.

11. A method of selecting address words each having n bit locations and serving for addressing m different receiving locations of a digital communications means, in at least one of the receiving locations, wherein:

each address word is subdivided into s address word segments;

the individual address word segments each are examined with respect to whether they are in conformity with a segment bit pattern that can occur in the respective address word segment of one of the address words that are acceptable for the receiving location in consideration;

and after examination of all address word segments of an address word received, an assessment for the individual address word segments is performed on the basis of the examination results, to the effect whether or not the respective address word received is an address word that is acceptable for the receiving location in consideration.

12. A method according to claim 11, in which the examination of the individual address word segments with respect to the presence of acceptable segment bit patterns includes masking of individual bits of the segment bit pattern such that it is determined for individual bit locations of the address word segment whether only a predetermined binary value or arbitrary binary values are to be accepted in the examination of this bit location.

13. An apparatus comprising:

an address segmenting device coupled to a digital reception site, said address segmenting device segmenting each address word received at said reception site into a plurality of address word segments, a plurality of digital filters, each digital filter including an input accepting a respective address word segment, each digital filter providing an output signal indicating conformity or non-conformity between a predetermined segment bit pattern and an address word segment;

a selector coupling each digital filter to said corresponding address word segment; and a circuit combining said output signals from said plurality of digital filters to provide a signal indicating acceptance or non-acceptance of said received address word.

14. An apparatus as claimed in claim 13 wherein said address segmenting device segments each address word received at said reception site into a set of equal-sized contiguous address word segments.

15. An apparatus as claimed in claim 13 wherein said combining circuit comprises:

an AND gate including a series of inputs, each input of said series coupled to a switch, each said switch providing either a logical ONE or an output of one of said digital segment filters, wherein only one of said outputs of said digital segment filters is coupled to one of said series of inputs at a time; and an output, wherein said series of switches operate to provide an output signal at said AND gate output corresponding to a time-contiguous concatenation of output signals from said digital filter segments.

16. An apparatus as claimed in claim 15, further comprising:

a shift register including an input coupled to said output of said AND gate, said shift register being clocked in synchrony with said switches to capture output signals from said AND gate output, said shift register including a number of cells equal to a number of said address word segments, each of said cells having an output; and an OR gate having a number of inputs equal to said number of cells, each of said outputs of said cells coupled to a different one of said OR gate inputs, whereby an output signal from said OR gate provides said signal indicating acceptance or non-acceptance of said received address word.

17. An apparatus as claimed in claim 15, further comprising:

an OR gate including a first input coupled to said output of said AND gate; and a D flip flop including a data input coupled to an output of said OR gate, an output coupled to a second input of said OR gate and a clock input coupled to a clocking signal that also clocks address word segments into said digital filter segments.

18. An apparatus as claimed in claim 13 wherein each of digital filters includes an input accepting an address word segment of two or more bits, and wherein one or more of said digital filters further includes a mask rendering at least one bit of one of said address word segments irrelevant to providing said signal indicating acceptance or nonacceptance of said received address word.

19. A method comprising steps of:

receiving an address word at a digital reception site;

parsing said address word into a set of address word segments, wherein said set includes all information contained in said address word;

providing each segment to a corresponding digital filter including a predetermined bit pattern; and combining output signals from said digital filters to provide an output signal indicating whether or not to accept a message following said address word.

20. A method as claimed in claim 19 wherein said step of parsing said address word includes a step of parsing said address word into a set of equal-sized contiguous address word segments each comprising two or more bits.

21. A method as claimed in claim 19 wherein said step of combining output signals comprises steps of:

coupling output signals from said digital filters, sequentially in response to a clock signal and one at a time, to a series of inputs of an AND gate having all other inputs coupled to a logical ONE;

storing output signals from said AND gate; and combining said output signals from said AND gate to provide said output signal indicating whether or not to accept said message following said address word.

22. A method as claimed in claim 20 wherein:

said step of storing output signals from said AND gate includes a step of storing output signals from said AND gate in consecutive cells of a shift register; and said step of combining said output signals from said AND gate includes a step of coupling each of said cells of said shift register to an input of an OR gate, whereby an output signal from said OR gate provides said output signal indicating whether or not to accept said message following said address word.

23. A method as claimed in claim 19 wherein said step of combining output signals from said digital filter segments includes steps of:

coupling output signals from said digital filter segments, sequentially in response to a clock signal and one at a time, to a series of inputs of an AND gate having all other inputs coupled to a logical ONE;

coupling output signals from said AND gate to an input to an OR gate;

coupling an output signal from said OR gate to a data input of a D flip flop;

coupling an output signal from said D flip flop to another input of said OR gate; and clocking said D flip flop in synchrony with clocking signals provided to said digital filter segments.

* * * * *